US012578952B2

(12) United States Patent
Goto

(10) Patent No.: US 12,578,952 B2
(45) Date of Patent: Mar. 17, 2026

(54) UPDATE CONTROL DEVICE, UPDATE CONTROL METHOD, AND UPDATE CONTROL PROGRAM

(71) Applicant: DENSO CORPORATION, Kariya-city (JP)

(72) Inventor: Fumihide Goto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 217 days.

(21) Appl. No.: 18/364,485

(22) Filed: Aug. 3, 2023

(65) Prior Publication Data

US 2024/0053976 A1     Feb. 15, 2024

(30) Foreign Application Priority Data

Aug. 9, 2022     (JP) ................................. 2022-127474

(51) Int. Cl.
    *G06F 9/44*          (2018.01)
    *G06F 8/65*          (2018.01)
(52) U.S. Cl.
    CPC ..................................... *G06F 8/65* (2013.01)
(58) Field of Classification Search
    CPC ..... G06F 8/65; G06F 8/71; G06F 8/60; G06F 8/70; H04L 41/0893; H04L 67/34; H04W 4/00
    See application file for complete search history.

(56) References Cited

U.S. PATENT DOCUMENTS

| | | | | |
|---|---|---|---|---|
| 9,880,828 B2 * | 1/2018 | Hu | ............................ | G06F 8/65 |
| 2008/0076401 A1 * | 3/2008 | Zeilingold | ................ | G06F 8/65 |
| | | | | 455/418 |
| 2020/0241033 A1 | 7/2020 | Altintas | | |
| 2021/0117177 A1 | 4/2021 | Noda | | |
| 2022/0197630 A1 | 6/2022 | Kobayashi | | |
| 2022/0207129 A1 | 6/2022 | Go et al. | | |

FOREIGN PATENT DOCUMENTS

| | | |
|---|---|---|
| JP | 2019-074322 A | 5/2019 |
| JP | 2019-196158 A | 11/2019 |
| JP | 2020-142565 A | 9/2020 |
| JP | 2020-173560 A | 10/2020 |
| JP | 2021-138368 A | 9/2021 |

* cited by examiner

*Primary Examiner* — Chuck O Kendall
(74) *Attorney, Agent, or Firm* — Harness, Dickey & Pierce, P.L.C.

(57)     ABSTRACT

An update control device for managing update includes: a first acquisition section acquires a first update file group including at least one file via wireless communication; a second acquisition section acquires a second update file group including at least one file via wired communication; a determination section determines a common file and a difference file; a decision section configured to decide on an application update file that is a file used for the update of the electronic control device; a delivery section configured to deliver the application update file to the electronic control device; and an instruction section configured to instruct the electronic control device.

13 Claims, 5 Drawing Sheets

UPDATE CONTROL DEVICE, UPDATE CONTROL METHOD, AND UPDATE CONTROL PROGRAM

CROSS REFERENCE TO RELATED APPLICATION

The present application claims the benefit of priority from Japanese Patent Application No. 2022-127474 filed on Aug. 9, 2022. The entire disclosure of the above application is incorporated herein by reference.

TECHNICAL FIELD

The present disclosure relates to a technology for controlling update of software of an electronic control device.

BACKGROUND

A conceivable technique describes an in-vehicle update device that is provided as a gateway in an in-vehicle device, and the in-vehicle update device delivers an update program to each in-vehicle ECU.

SUMMARY

According to an example, an update control device for managing update of an electronic control device may include: acquiring from outside via wireless communication a first update file group; acquiring from outside via wired communication a second update file group; determining a common file that is common to both the first update file group and the second update file group, and a difference file; deciding on an application update file; delivering the application update file to the electronic control device; and instructing the electronic control device to update the electronic control device with the application update file.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figures 1, 2:
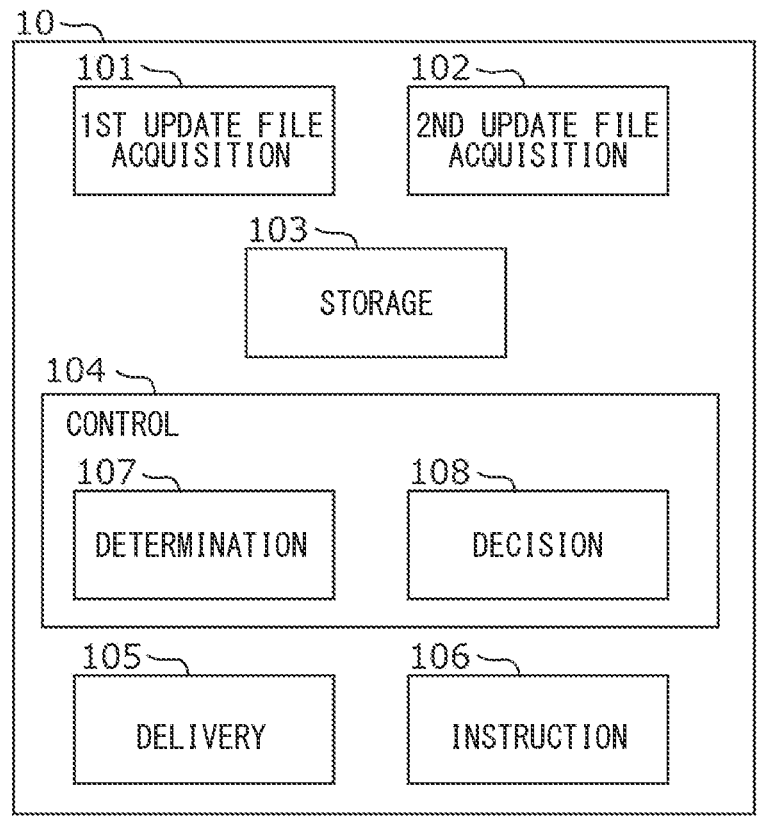
FIG. 1 is a diagram explaining a configuration example of an electronic control system according to a first embodiment.
FIG. 2 is a diagram explaining a configuration example of an update control device according to each embodiment.

Vehicles are equipped with various electronic control units connected by an in-vehicle network. With the recent development of autonomous driving technology, the functions required for vehicles are becoming more complex, and the number of electronic control units mounted on vehicles is increasing.

An increase in the number of electronic control units also complicates the processes of updating the software for each electronic control unit when the update of the electronic control unit is needed.

Here, as a result of detailed consideration by the inventor, the inventor found the following.

When an electronic control device installed in a vehicle is updated, it is assumed that an update file is obtained via a communication means consisting of a wireless communication system, or an update file is obtained via a communication means consisting of a wired communication system in a case where a vehicle is parked in a parking lot or housed in a repair shop. When an update file can be obtained via multiple communication means such as via a wireless communication and a wired communication, the update file may be obtained via one communication system while updating the electronic control unit using an update file obtained via another communication system. When an update file is obtained through different communication means, it has not been defined which update file is used to update an electronic control device.

The present disclosure describes a device that appropriately controls an electronic control unit when an update file is obtained simultaneously via a wireless communication system and a wired communication system.

According to an aspect of the present disclosure, an update control device for managing update of an electronic control device mounted on a mobile object may be provided. The update control device may include a first acquisition section, a second acquisition section, a determination section, a decision section, a delivery section, and an instruction section. The first acquisition section is configured to acquire from outside the mobile object via wireless communication a first update file group including at least one file to update the electronic control device. The second acquisition section is configured to acquire from outside the mobile object via wired communication a second update file group including at least one file to update the electronic control device. The determination section is configured to determine a common file that is common to both the first update file group and the second update file group, and a difference file that is not common to the first update file group and the second update file group, in a case where the second acquisition section acquires the second update file group after the first acquisition section acquires the first update file group and before update with the at least one file in the first update file group is completed. The decision section is configured to decide on an application update file that is a file used for the update of the electronic control device according to whether the common file and/or the difference file in the first update file group is delivered to the electronic control device and whether an update instruction is issued. The delivery section is configured to deliver the application update file to the electronic control device. Then instruction section is configured to instruct the electronic control device to update the electronic control device with the application update file.

According to another aspect of the present disclosure, an update control method executed by an update control device managing update of an electronic control device mounted on a mobile object is provided.

The method may include: acquiring from outside the mobile object via wireless communication a first update file group including at least one file for updating the electronic control device; acquiring from outside the mobile object via wired communication; a second update file group including at least one file for updating the electronic control device; determining a common file that is common to both the first update file group and the second update file group, and a difference file that is not common to the first update file group and the second update file group, in a case where the second update file group is acquired after acquisition of the first update file group and before completion of update with the at least one file in the first update file group; deciding on an application update file that is a file used for the update of the electronic control device according to whether the common file and/or the difference file in the first update file group is delivered to the electronic control device and whether an update instruction is issued; delivering the application update file to the electronic control device; and instructing the electronic control device to update the electronic control device with the application update file.

According to another aspect of the present disclosure, a non-transitory computer-readable storage medium storing an update control program that causes a computer to implement the above method is provided.

According to this configuration, when update files are obtained almost simultaneously via the wireless communication means and the wired communication means, it may be possible to appropriately execute the update process of the electronic control device. Furthermore, by controlling the updating process of the electronic control device, it may be possible to suppress a rollback process that is required after the updating process.

Embodiments of the present disclosure will be described with reference to the drawings.

When there are multiple embodiments, a configuration disclosed in each embodiment may not be limited to each embodiment, alternatively, configurations can be combined across embodiments. For example, a configuration disclosed in one embodiment may be combined with other embodiments. The disclosed configurations in respective multiple embodiments may be partially combined.

First Embodiment (Electronic Control System)

An electronic control system S including an electronic control device 10 of the present embodiment will be described with reference to FIG. 1. In the embodiment described, the electronic control system S and the electronic control device 10 are assumed to be an onboard system and an onboard device "mounted" on a vehicle as a "mobile object" but are not limited thereto. A mobile object may be referred to as a mobile body.

The "mobile object" refers to a movable object, and a travel speed of the mobile object is arbitrary. Here, this also includes a case where the mobile object is stopped. Examples of the mobile object include automobiles, motorcycles, bicycles, pedestrians, ships, aircrafts, and objects mounted thereon. The mobile object may not be limited to these examples.

Further, the term "mounted" includes not only a case where an object is directly fixed to the mobile object but also a case where an object is moved together with the mobile object although the object is not fixed to the mobile object. Examples of "mounted" include a case when a person on a mobile object carries an object and a case when an object mounted on a load placed in the mobile object.

The electronic control system S is a system including multiple electronic control devices (also referred to as Electronic Control Units, ECUs). FIG. 1 shows the electronic control system S including two ECUs (ECU 20a, ECU 20b) in addition to an update control device 10. The electronic control system S may include any number of ECUs. Each ECU is connected to each other via a communication network. The communication network is, for example, an in-vehicle network such as CAN (Controller Area Network) or LIN (Local Interconnect Network), Ethernet (registered trademark), or a wireless communication network. In the following description, ECU 20a and ECU 20b will be referred to as each ECU 20 or simply as the ECU 20 unless it is necessary to distinguish between them.

(Update Control Device)

(Configuration of the Update Control Device)

The update control device 10 is a device that manages update of each ECU 20 configuring the electronic control system S. A configuration example of the update control device 10 will be described with reference to FIG. 2. The update control device 10 includes a first update file acquisition section 101, a second update file acquisition section 102, a storage section 103, a control section 104, a delivery section 105 and an instruction section 106. The control section 104 controls operations of the first update file acquisition section 101, the second update file acquisition section 102, the storage section 103, the delivery section 105, and the instruction section 106. The control section 104 further implements a determination section 107 and a decision section 108.

Although not shown in FIG. 2, the update control device 10 may have a function other than functions related to update control. For example, like an ECU 20 described below, the update control device 10 may have an update section for updating an ECU, which is the update control device. The update control device 10 may have an update section for updating an ECU on which the update control device is implemented.

The update control device 10 may be composed of a general-purpose CPU (Central Processing Unit), a volatile memory such as RAM, a non-volatile memory such as ROM, flash memory, or hard disk, various interfaces, and an internal bus for connecting them. By executing software on these hardware, a function of each functional block illustrated in FIG. 2 can be implemented. The update control device 10 may be implemented by dedicated hardware such as an LSI.

It is supposed that the update control device 10 is a form of an ECU as a semi-finished product in the present embodiment. The present disclosure is not limited to this. For example, as a component, the update control device 10 may be implemented by a semiconductor circuit or a semiconductor module. As a semi-finished product, the update control device 10 may be implemented by an electronic control device, electronic control units, and system boards. As a finished product, the update control device 10 may be implemented by a server, a workstation, a personal computer (PC), a tablet, a smartphone, a mobile phone and a navigation system. The update control device 10 may include a single ECU or multiple ECUs.

The first update file acquisition section 101 acquires an update file group including one or more files for updating the ECU 20 from outside a vehicle via wireless communication. The first update file acquisition section 101 corresponds to a first acquisition section. For example, the first update file acquisition section 101 acquires the update file group transmitted from a server device or the like via a wireless communication such as IEEE 802.11 (Wi-Fi (registered trademark)), IEEE 802.16 (WiMAX (registered trademark)), W-CDMA (Wideband Code Division Multiple Access), HSPA (High Speed Packet Access), LTE (Long Term Evolution), LTE-A (Long Term Evolution Advanced), 4G, 5G, and DSRC (Dedicated Short Range Communication). Alternatively, the first update file acquisition section 101 may acquire the update file group via an ECU having a communication function such as a TCU (Telematics Control Unit). Hereinafter, the update file group acquired by the first update file acquisition section 101 will be referred to as a first update file group.

When the update control device 10 itself has a communication function, and the first update file acquisition section 101 acquires the update file group from outside the vehicle without going through the TCU or the like, the first update file acquisition section 101 is referred to as an OTA (Over The Air) client in the AUTOSAR (AUTomotive Open System ARchitecture) specifications.

The second update file acquisition section 102 acquires an update file group including one or more files for updating the ECU 20 from outside a vehicle via wired communication. The second update file acquisition section 102 corresponds to a second acquisition section. The second update file acquisition section 102 acquires an update file group from a dedicated device through OBD (On-Board Diagnostics, On BoarD) connection when the vehicle is housed in a repair shop, for example. Alternatively, when the vehicle is parked in a parking lot, the second update file acquisition section 102 may acquire the update file group by connecting the vehicle to a wired LAN (Local Area Network) or Internet. The update file group acquired by the second update file acquisition section 102 will be referred to as a second update file group.

An update file group includes one or more update files for updating software installed in each ECU 20. Alternatively, an update file group may include a divided file obtained by dividing one update file into multiple files. An update file group may further include information for specifying an ECU on which software to be updated is installed, information indicating the order in which the update files are to be executed, or information indicating the order in which update of software is executed. An ECU to be updated with an update file will be referred to as an update target ECU or a target ECU.

An update file may be a file for updating software operating on an operating system (OS) installed in the ECU 20. Alternatively, an update file may be a file for updating software, which is middleware (for example, OS) that operates the ECU 20 itself. As described above, the update file updates software installed in the ECU 20. In the following explanation, it is assumed that the update file updates the ECU 20.

The storage section 103 is a non-volatile memory such as a ROM, flash memory, or hard disk. The storage section 103 stores update file groups acquired by the first update file acquisition section 101 and the second update file acquisition section 102. When the update control device 10 itself is an ECU to be updated, that is, when the update control device corresponds to an update target ECU, the storage section 103 may further store software to be updated by the update file.

The control section 104 implements a determination section 107 and a decision section 108. The control section 104 has functions to control delivery of an update file and update instruction. The control section 104 may be referred to as a UCM (Update and Configuration Management) master in the AUTOSAR specifications.

The determination section 107 determines a common file and a difference file between the first update file group and the second update file group when the second update file acquisition section 102 acquires the second update file group after the first update file acquisition section 101 has "acquired" the first update file group and before completion of update of the ECU 20 with use of the update file included in the first update file group. Here, a common file is a file commonly included in both the first update file group and the second update file group. A difference file is a file that is not common to the first update file group and the second update file group. For example, when the first update file group includes a certain file and the second update file group does not include this file, the certain file corresponds to a difference file. The determination section 107 compares the first update file group and the second update file group to determine a common file and a difference file in each of the first update file group and the second update file group.

The word "acquired" means not only acquiring all the update files, but also acquiring the update files to the extent that the contents of the update files can be specified, such as acquiring a list of files included in the update file group.

For example, it is assumed that update files included in the first update file group and the second update file group are files for updating the ECU 20_a_ and the versions of these files are the same. In this case, the update files included in the first update file group and the second update file group are common files.

On the other hand, for example, it is assumed that the update files included in the first update file group and the second update file are files for updating the ECU 20_a_, but the version of the update file included in the first update file group is [1.0], and the version of the update files included in the second update file group is [1.1]. In this case, these update files are files that are not common to the first update file group and the second update file group. Therefore, each file having versions [1.0] and [1.1] is difference file.

As another example, the first update file group may contain the update file for the ECU 20_a_, and the second update file group may not contain the update file for the ECU 20_a_. In this case, the update file for updating the ECU 20_a_ included in the first update file group corresponds to a difference file since the update file in the first update file group file for updating the ECU 20_a_ is not common to the first update file group and the second update file group. In this example, the second update file group does not include a difference file, but only the second update file group may include a differential file. Furthermore, the first update file group may include both a common file and a difference file. the second update file group may include both a common file and a difference file.

The determination section 107 determines whether or not the determination section 107 receives a signal indicating completion of update with the update file from the update target ECU 20. The determination section 107 determines whether or not the update of the ECU 20 with the update file included in the first update file group has been completed, depending on whether or not the signal indicating completion of update has been received from the update target ECU 20. Alternatively, when the second update file acquisition section 102 acquires the second update file group, the determination section 107 may transmit a signal inquiring about update status to the update target ECU 20. The determination section 107 may determine whether or not the update of the ECU 20 with the update file included in the first update file group has been completed based on a signal indicating the update status transmitted from the ECU 20. In response to the inquiry from the determination section 107, the ECU 20 may transmit version information or the like of software installed in the ECU 20 to the update control device 10 together with information indicating the update status of the ECU 20. Incidentally, for example, the signal indicating the update status represents a status in which an update file has been delivered to the update target ECU 20, a status in which an update instruction with the update file has been issued to the update target ECU 20 or the like.

Incidentally, the determination section 107 may further determine whether or not the common file has been delivered to the electronic control device, whether or not the difference file has been delivered to the electronic control device, and whether or not the instruction section has issued the update instruction to the electronic control device.

The decision section 108 decides on an update file to be used for updating the ECU 20 according to update status of the common file and the difference file determined by the determination section 107. An update file to be used for updating the ECU 20 corresponds to an application update file. Details of the processing by the decision section 108 will be described later. The application update file may be referred to as an applied update file.

The delivery section 105 delivers to the update target ECU 20 the update file to be used for updating an ECU 20 determined by the decision section 108 from among the update files stored in the storage section 103. When the delivery section 105 delivers the update file group to the ECU 20, one file included in the update file group may be divided into several files, and the divided files may be sequentially delivered to the ECU 20.

The meaning "Deliver" includes directly delivering a file from an update control device to an electronic control device, indirectly delivering a file to an electronic control device via another electronic control device, and moving a file storage area in a memory. The file to be delivered may be the entire file or part of the divided file.

The instruction section 106 instructs the update target ECU 20 to update an ECU with the update file determined by the decision section 108. For example, the instruction section 106 instructs the update of the ECU 20 when the delivery section 105 delivers the update file to the update target ECU 20 and the instruction section 106 receives from the update target ECU 20 a signal indicating that the update file has been acquired.

The instruction section 106 further instructs the update target ECU 20 to stop the update when it is necessary to stop the update process after instructing the update target ECU 20 to perform the update. Alternatively, the instructing section 106 instructs the ECU 20 to roll back when it is necessary to return the ECU 20 to the state before the update after the ECU 20 completes the update based on the update instruction. Returning to the state before the update is called rollback. The instruction section 106 issues an instruction for update. In addition, the instruction section 106 issues an instruction for stop update and an instruction for rollback.

When there are multiple ECUs 20 to be updated, the instruction section 106 sequentially instructs the update target ECUs 20 starting with an update target ECU 20 whose update file has been delivered. Alternatively, the instruction section 106 may issue an update instruction to all the update target ECUs 20 all at once. In an electronic control system, especially an in-vehicle system, multiple ECUs may operate in conjunction with each other. When the versions of software installed in multiple ECUs are different from each other, they may not operate properly. When the versions of software installed in multiple ECUs are inconsistent with each other, they may not operate properly. Therefore, it may be desirable to update the ECU at the same timing. When it is desirable to update the ECUs 20 at the same timing, the instruction section 106 instructs the update target ECUs 20 to update all at once after the update files have been delivered to all the update target ECUs 20, so that the update of the multiple interlocking ECUs 20 is performed at the same timing.

Alternatively, the instruction section 106 may instruct the update target ECUs 20 to update in a predetermined order. For example, when the update file group contains information indicating the order in which updates are to be performed, the instruction section 106 issues an update instruction in accordance with this order, so that the update target ECUs 20 are updated in the specified order. In order to execute the update in the specified order, for example, the instruction section 106 sequentially issues the update instruction in the order of execution of the update or issues the update instruction with designating the time to execute the update. When the order of execution of update is not specified, for example, the instruction section 106 may issue the update instructions in the order from a file that facilitates rollback processing in the event of update failure.

In the present embodiment, functions and operations of the delivery section 105 and the instruction section 106 are described for the case where the second update file acquisition section 102 acquires the second update file group after the first update file acquisition section 101 acquires the first update file group and before the update of the ECU with the update file included in the first update file group is completed. However, even when the first update file acquisition section 101 and the second update file acquisition section 102 acquire update files at a timing different from the present embodiment, the delivery section 105 delivers the update file to the update target ECU 20, and the instruction section 106 instructs the update target ECU 20 to update the update target ECU 20.

For example, when the first update file acquisition section 101 acquires the first update file group and the second update file acquisition section 102 does not acquire the second update file group, the delivery section 105 delivers the update file included in the first update file group to the update target ECU 20. The instruction section 106 instructs update of the update target ECU 20 with the update file delivered by the delivery section 105.

As a different example, it is assumed that the second update file acquisition section 102 acquires the second update file group after update of the update target ECU 20 by the update file included in the first update file group acquired by the first update file acquisition section 101 has been completed. In this case, the delivery section 105 delivers the update file included in the second update file group to the update target ECU 20, and the instruction section 106 may instruct the update target ECU 20 to update the update target ECU 20 with the update file delivered by the delivery section 105.

(Processing of the Decision Section)

A process of deciding an update file used for updating the update target ECU 20 by the decision section 108 will be described. The decision section 108 decides on an update file to be used (also referred to as applied) for updating the update target ECU 20 according to whether a common file and/or a difference file included in the first update file group has been delivered to the update target ECU 20, and whether an update instruction using the common file and/or the difference file has been issued. Incidentally, an update instruction using a common file and/or a difference file may correspond to an update instruction to instruct update of an ECU with a common file and/or a difference file.

A case where the first update file group and the second update file group include a common file will be described. The decision section 108 determines whether or not a common file included in the first update file group has been delivered from the delivery section 105 to the update target ECU 20. When the common file included in the first update file group has not yet been delivered, the decision section 108 decides on the common file included in the second update file group as the update file to be used for updating the update target ECU 20. Here, the common file included in the first update file group corresponds to a first common file. The common file included in the second update file group corresponds to a second update file. When the common file included in the first update file group has been delivered, the decision section 108 decides on the common file included in the first update file group as the update file to be used for updating the update target ECU 20. In other words, in this case, the decision section 108 decides that the common file in the first update file group is applied as the update file to update the ECU 20.

As described above, a common file is a file common to the first update file group and the second update file group. After delivery of the common file included in the first update file group, it is preferable to update the ECU 20 with the already delivered common file of the first update file group. When the ECU 20 is updated with the common file of the second update file, a file having the same content (that is, the common file) is transmitted again, causing resources of the in-vehicle communication network to be unnecessarily used.

On the other hand, it is preferable to update the ECU 20 with the common file included in the second update file group before the common file included in the first update file group is delivered. When the update of the ECU 20 has not been completed for some reason, a signal may be sent to a sender (may be referred to as a source device) of the update file to notify that the update is not completed. Alternatively, the sender that received the signal notifying that the update is not completed may send the update file or an update file group to the update control device 10 again. When the sender of the update file is a server device, it is necessary to send and receive signals and to send the update file via wireless communication, causing to consume resource of wireless communication network. On the other hand, when the sender of the update file group is a device connected by wire to the electronic control system S, the update file group can be acquired again without consuming the resources of the wireless communication network. Additionally, by using a device that is OBD-connected to the electronic control system S, it may be possible to immediately detect a failure causing incomplete of the update. Therefore, before the delivery of the common file included in the first update file group, the ECU 20 is updated with the common file included in the second update file group.

Incidentally, when the file size of the common file is large, or when the file size of the common file is greater than a predetermined value, the common file may be divided into several files, and the delivery section 105 may transmit the divided common files to the update target ECU 20. In this case, the decision section 108 may decide on the update file used for updating the ECU 20 according to a delivery status of each divided common file.

For example, a case where a common file included in the first update file group is divided into two files (for example, a common file A and a common file B) will be described. It is assumed that the common file A has already been delivered to the ECU 20 and the common file B has not yet been delivered. In this case, the decision section 108 decides on the common file A, which has already delivered to the ECU 20, as the update file to be used for updating the ECU. On the contrary, the decision section 108 does not decide on the common file B, which is not delivered, as an update file to be used for updating the ECU. Then, among the common files included in the second update file group, the decision section 108 decides on a file corresponding to the common file B as the update file to be used for updating the ECU. According to this example, the ECU 20 is updated with the common file (corresponding to the common file A) included in the first update file group and the common file (corresponding to the common file B) included in the second update file group.

A difference file described later may be divided into multiple files. The delivery section 105 may sequentially transmit the divided difference files to the ECU 20.

A case will be described where the first update file group includes only a common file, that is, does not include a difference file, and the second update file group includes a difference file in addition to a common file. As described above, the decision section 108 decides on which common file included in the first update file group and the second update file group is used to update the ECU 20 depending on whether the common file included in the first update file group is before or after delivery. Furthermore, the decision section 108 decides on the difference file included in the second update file group as update files to be used for updating the ECU.

On the contrary, a case will be described where the first update file group includes a difference file in addition to a common file and the second update file group includes a common file and does not include a difference file. As described above, the decision section 108 decides on which common file included in the first update file group and the second update file group is used to update the ECU 20 depending on whether or not the common file included in the first update file group has been delivered. The decision section 108 does not decide on the difference file included in the first update file group as update files to be used for updating the ECU.

However, after the delivery section 105 has already delivered the difference file included in the first update file group to the ECU 20 and the instruction section 106 has issued an update instruction with use of the difference file, the ECU 20 may have already started updating with the difference file. In that case, the instruction section 106 instructs to stop updating with the difference file. Alternatively, the instruction section 106 instructs to return to the state before executing the update with the difference file after the update of the ECU 20 with the difference file is completed.

A case where the first update file group and the second update file group each include a difference file will be described. A difference file included in the first update file group is referred to as a first difference file. A difference file included in the second update file group is referred to as a second difference file.

When the delivery section 105 has not yet delivered the first difference file, the decision section 108 decides on the second difference file as the update file. The delivery section 105 delivers the determined second difference file, and the instruction section 106 instructs updating with the second difference file. Incidentally, the decision section 108 does not decide on the first difference file as the update file to be used for updating the ECU 20. The delivery section 105 does not deliver the first difference file to the ECU 20. Therefore, the ECU 20 does not perform updating with the first difference file.

After the delivery section 105 delivers the first difference file and before the instruction section 106 issues an update instruction using the first difference file, the decision section 108 decides on the second difference file as the update file. The delivery section 105 delivers the determined second difference file. The instruction section 106 instructs the ECU 20 to update the ECU 20 with the second difference file. Incidentally, the decision section 108 does not decide on the first difference file as an update file to be used for updating the ECU 20. Therefore, the instruction section 106 does not instruct update with the first difference file. Therefore, the ECU 20 does not perform update with the first difference file.

The instruction section 106 may instruct discarding of the first difference file instead of not instructing update with the first difference file.

After the delivery section 105 delivers the first difference file and after the instruction section 106 has issued an update instruction with the first difference file, the decision section 108 decides on the second difference file as the update file. The delivery section 105 delivers the determined second difference file, and the instruction section 106 instructs update with the second difference file. The instruction section 106 further instructs to stop updating with the first difference file. The ECU 20 is not updated by the first difference file.

After the delivery section 105 delivers the first difference file and after the instruction section 106 has issued an update instruction using the first difference file, the update of the ECU 20 by the first difference file may have progressed to some extent. In that case, the instruction unit 106 instructs rollback processing. In the rollback processing, after the update of the ECU 20 by the first difference file is completed, the state before the update by the first difference file is restored.

Generally, a device connected to the electronic control system S via wired communication stores the latest update file. An update file may be an update file that is provided only from OBD-connected devices such as repair shops. As a general rule, it may be preferable to update the ECU with a file included in the update file group in a case when the update file included in the update file group is acquired via wired communication. Therefore, when the second update file group includes a difference file, the decision section 108 decides on the difference file as an update file to be used for updating the ECU 20. On the other hand, an update file provided from a device connected via wireless communication may not always require updating. Since it is an update file provided via wireless communication, the update file via wireless communication may be a file hiding an attack from the outside. In particular, a file that is not included in the update file group provided via wired communication such as an OBD connection but is included only in the update file group provided via wireless communication may be an irregular update file. An irregular update file corresponds to a file that is not a regular update file. Therefore, when the first update file group includes a difference file, the decision section 108 does not decide on the difference file as an update file to be used for updating the ECU.

A certain update file may only be provided via either one of wireless communication or wired communication. For example, the update file of the ECU 20a is always acquired via wireless communication and never acquired via wired communication. In such a case, the update file of the ECU 20a acquired via wireless communication is always a difference file different from the update file obtained via wired communication. When the present embodiment is applied, the update of the ECU 20a may not properly performed. Therefore, such an update file may be flagged to indicate that the update file is provided only via wireless communication. By adding a flag, it may be preferable to suppress update stop or rollback processing even if the decision section 108 determines that the file is a difference file.

(ECU)

Each ECU 20 that configures the electronic control system S has an update section 201 that updates software and a storage section 202.

The update section 201 performs update processing with an update file based on an instruction from the update control device 10. The update section 201 may be defined as a UCM subordinate in the AUTOSAR specifications.

When the software update process is completed, the update section 201 transmits to the update control device 10 an update completion notification indicating that the update has been completed. When the software update process fails, the update section 201 transmits to the update control device 10 an update failure notification indicating that the update has failed.

Further, when the update section 201 receives a rollback instruction from the update control device 10, the update section 201 performs rollback processing in which a software is returned to the state before the update.

The storage section 202 is a non-volatile memory such as ROM, flash memory, or hard disk. The storage section 202 stores software and update files installed in each ECU. Although not shown in FIG. 1, the storage section 202 may have multiple storage areas.

Each ECU 20 of the present embodiment is, for example, an ECU based on a platform defined as Adaptive Platform (AP) in AUTOSAR specifications, which can dynamically expand functions. The AP may be mainly a platform suitable for an ECU for autonomous driving. Alternatively, an ECU may be, for example, an ECU based on a platform in which functions are statically optimized, defined as Classic Platform (CP) in the AUTOSAR specifications. The CP is mainly a platform suitable for an ECU for vehicle control.

(Operation of the Update Control Device)

Figure 3:
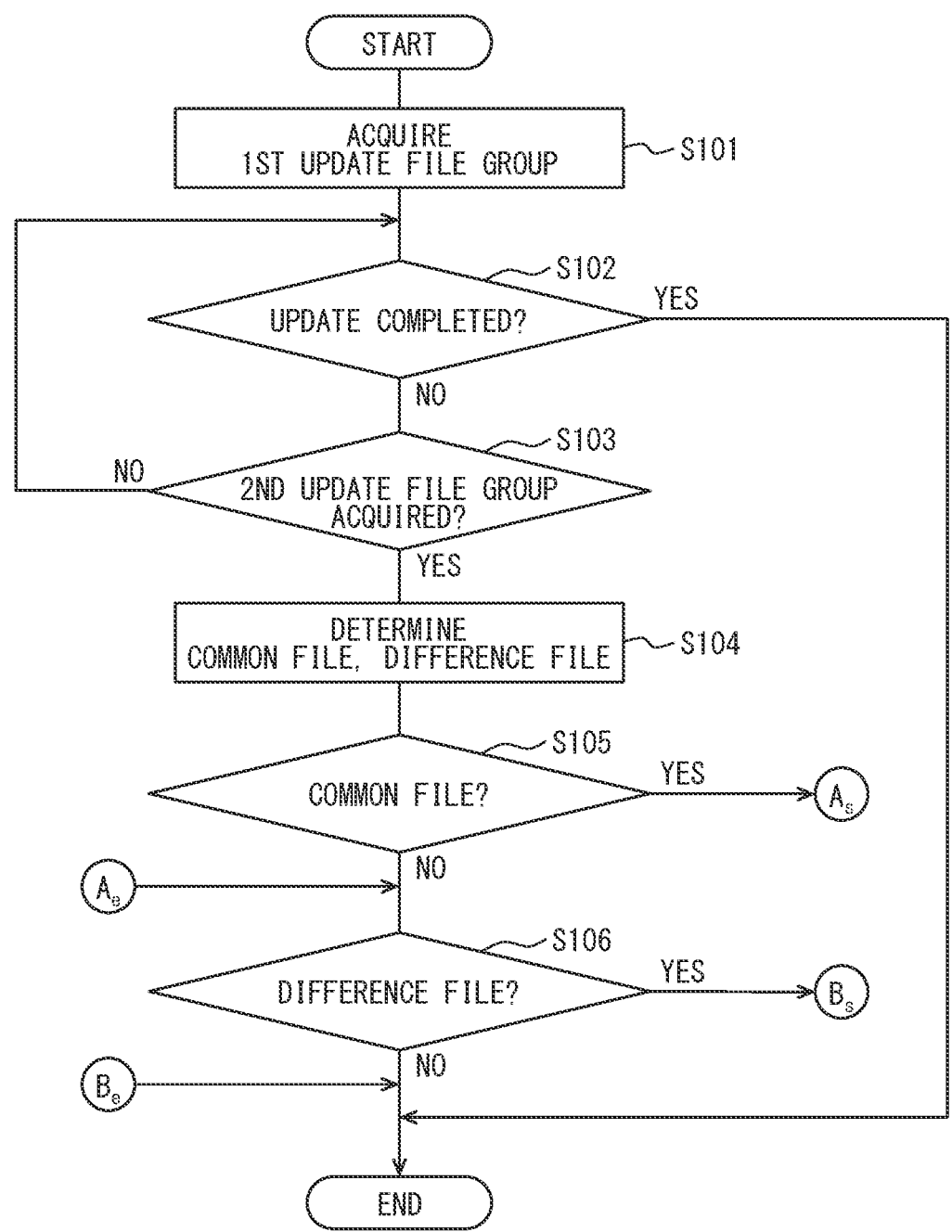
FIG. 3 is a diagram explaining an operation of an update control device according to each embodiment.
Figure 4:
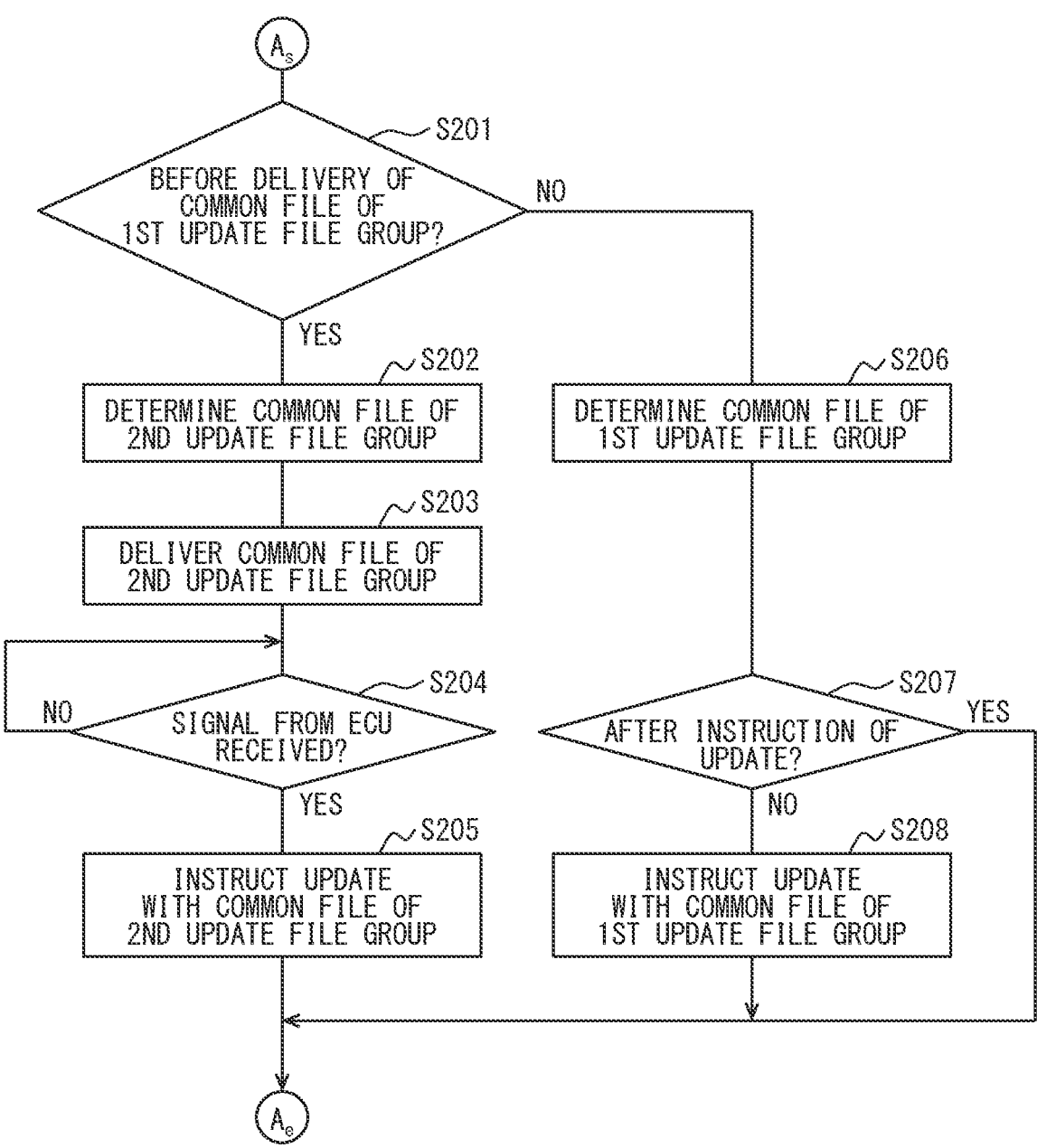
FIG. 4 is a diagram explaining an operation of an update control device according to each embodiment.
Figure 5:
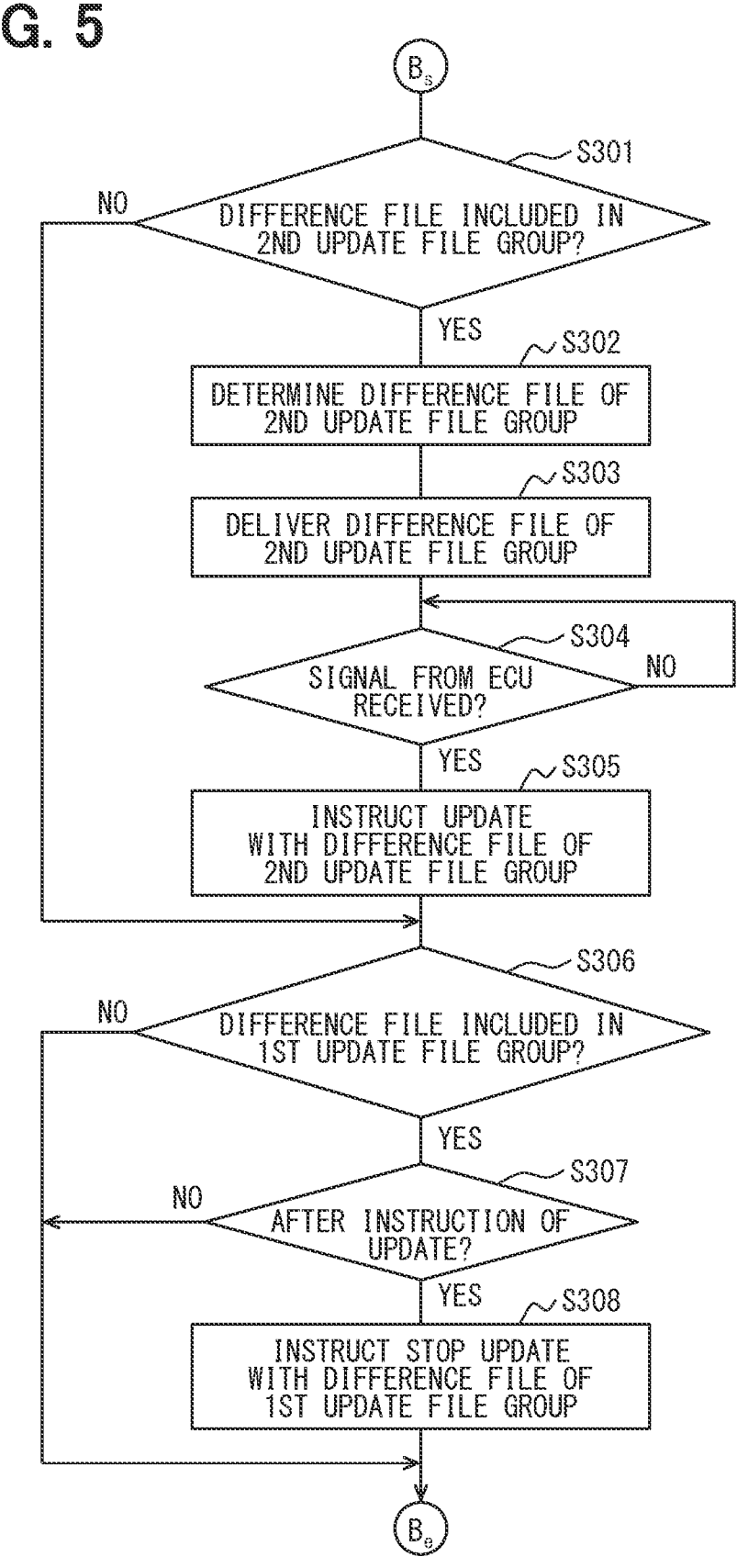
FIG. 5 is a diagram explaining an operation of an update control device according to each embodiment.

The operation of the update control device 10 will be described with reference to FIG. 3 to FIG. 5. The operations shown in FIG. 3 to FIG. 5 represent the update control method executed by the update control device 10. In addition, the operations shown in FIG. 3 to FIG. 5 show processing procedures of an update control program that can be executed by the update control device 10. These processes are not limited to the order shown in these drawings. That is, the order may be changed as long as there is no restriction such as a relation in which a result of the preceding step is used in a certain step.

The first update file acquisition section 101 of the update control device 10 acquires a first update file group from outside the vehicle via wireless communication (S101).

When the update of the ECU 20 with the update file group obtained in S101 is completed, the process terminates (S102: Y). When the update of the ECU 20 is not completed (S102: N), the second update file acquisition section 102 determines whether or not the update file group has been acquired from outside the vehicle via wired communication (S103).

When the second update file acquisition section 102 acquires the update file group in S103 (S103: Y), the determination section 107 determines a common file and a difference file included in the update file groups acquired by the first update file acquisition section 101 and the second update file acquisition section 102 (S104).

In S104, when the determination section 107 determines a common file included in the first update file group and the second update file group (S105: Y), a series of processes shown in FIG. 4 are performed (As).

FIG. 4 shows processing when the determination section 107 determines that the first update file group and the second update file group includes a common file in S104 of FIG. 3.

The determination section 107 determines whether the common file included in the first update file group is before or after being delivered to the ECU 20 (S201).

When the common file included in the first update file group is before delivery (S201: Y), the decision section 108 decides on the common file included in the second update file group as the update file to be used for updating the ECU 20 (S202).

Next, the delivery section 105 delivers the common file included in the determined second update file group to the ECU 20 (S203).

After delivering the update file of the second update file group to the ECU 20, the instruction section 106 waits for a signal indicating that the update file has been acquired. When the instruction section 106 receives from the ECU 20 the signal indicating that the ECU 20 has acquired the update file (S204: Y), the instruction section 106 instructs the ECU 20 to update the ECU 20 with the common file delivered in S203 (S205).

As a result of the determination in S201, when the common file included in the first update file group is after delivery (S201: N), the decision section 108 decides on the common file included in the first update file group as the update file used for updating the ECU 20 (S206).

When the instruction section 106 does not issue to the ECU 20 an update instruction with the common file included in the first update file group (S207: N), the instruction section 106 instructs the update with the common file included in the first update file group (S208).

Returning to FIG. 3, the operation of the update control device 10 will be described. When the series of processes shown in FIG. 4 is completed, or when it is determined that files included in the first update file group and the second update file group do not include a common file, the process proceeds to S106.

Based on a determination in S104, when the determination section 107 determines that the first update file group and the second update file group include a difference file (S106: Y), a series of processes shown in FIG. 5 are performed (Bs).

FIG. 5 shows processing when the determination section 107 determines in S106 that the first update file group and/or the second update file group includes a difference file.

When the second update file group includes the difference file (S301: Y), the decision section 108 decides on the difference file included in the second update file group as the update file to be used for updating the ECU 20 (S302).

Next, the delivery section 105 delivers the difference file included in the determined second update file group to the ECU 20 (S303).

After the difference file is delivered to the ECU 20 and when the instruction section 106 receives from the ECU 20 a signal indicating that the ECU 20 has acquired the difference file (S304: Y), the instruction section 106 instructs the ECU 20 to update the ECU 20 with the difference file delivered in S303 (S305).

On the contrary, when the second update file group does not include the difference file (S301: N), the processing goes to S306. When the first update file group includes the difference file (S306: Y) and when the instruction section 106 instructs the update with the difference file included in the first update file group (S307: Y), the instruction section 106 instructs the ECU 20 to stop updating with the difference file included in the first update file group (S308).

Incidentally, instead of S308 shown in FIG. 5, the instruction section 106 may issue a rollback instruction to return to the state before the update with the difference file after the update with the difference file included in the first update file group is completed.

When the series of processes shown in FIG. 5 complete, or when it is determined that files included in the first update file group and the second update file group are not difference files, the update control device 10 terminates the process.

Although not shown in FIG. 3, in determining the update status of the first update file group in S102, the update control device 10 may transmit a signal to inquire the update target ECU 20 about the update status.

According to the present embodiment, when update files are acquired at the same time or almost simultaneously via wireless communication and wired communication, it may be possible to update an ECU with an appropriate update file. In addition, depending on the type of update file, update is performed with an update file for which delivery or update instruction has been completed, so that it may be possible to reduce a processing load on the communication network. Furthermore, by preventing the ECU from being updated with an unnecessary update file, it may be possible to suppress rollback processing for unnecessary update files.

Modification

In the embodiment described above, an example is described in which the control section 104 controls the update of the ECU 20 in a case where the second update file acquisition section 102 acquires the second update file group after the first update file acquisition section 101 acquires the first update file group and before the update of the ECU with the update files included in the first update file group is completed. Incidentally, the update control device 10 may control the update of the ECU 20 even in a case where the second update file acquisition section 102 has acquired the second update file group after the update with the first update file group acquired by the first update file acquisition section 101 is completed.

Similar to the first embodiment, the determination section 107 determines a common file and a difference file included in the first update file group and the second update file group when the second update file acquisition section 102 acquires the second update file group after the update with the first update file group acquired by the first update file acquisition section 101 is completed.

When the first update file group and the second update file group include a common file, the decision section 108 decides on the common file of the first update file group as a file to be used for updating the ECU 20. Since the update by the common file of the first update file group has already been completed, the update control device 10 does not perform further update processing on the ECU 20.

When the second update file group includes a difference file, the decision section 108 decides on the difference file of the second update file group as a file to be used for updating the ECU 20. In this case, the delivery section 105 delivers the difference file of the second update file group to the update target ECU 20. The instruction section 106 instructs the update target ECU 20 to be updated with the difference file delivered by the delivery section 105.

On the other hand, when the first update file group includes a difference file, the instruction section 106 instructs rollback processing, that is, the processing to return to the state before updating with the difference file of the first update file group whose update has already been completed.

When a period of time has elapsed after the first update file acquisition section 101 acquired the update file group and before the second update file acquisition section 102 acquires the update file group, the contents of files included in these update file groups may be completely different. According to this modified example, even though the difference file in the first update file group is a regular update file, and not a file hiding an attack from the outside, the update target ECU 20 may be returned to the state before the update by the rollback process. Only when a time from when the first update file acquisition section 101 acquires the update file group to when the second update file acquisition section 102 acquires the update file group is within a predetermined period, it may be preferable to apply this modified example.

Second Embodiment

In the above embodiment, it is assumed that the ECUs 20 configuring the electronic control system S are different hardware and that the update control device 10 and the ECUs 20 are different or separated hardware. The update control device 10 and each ECU 20 are not limited to different hardware.

Figure 6:
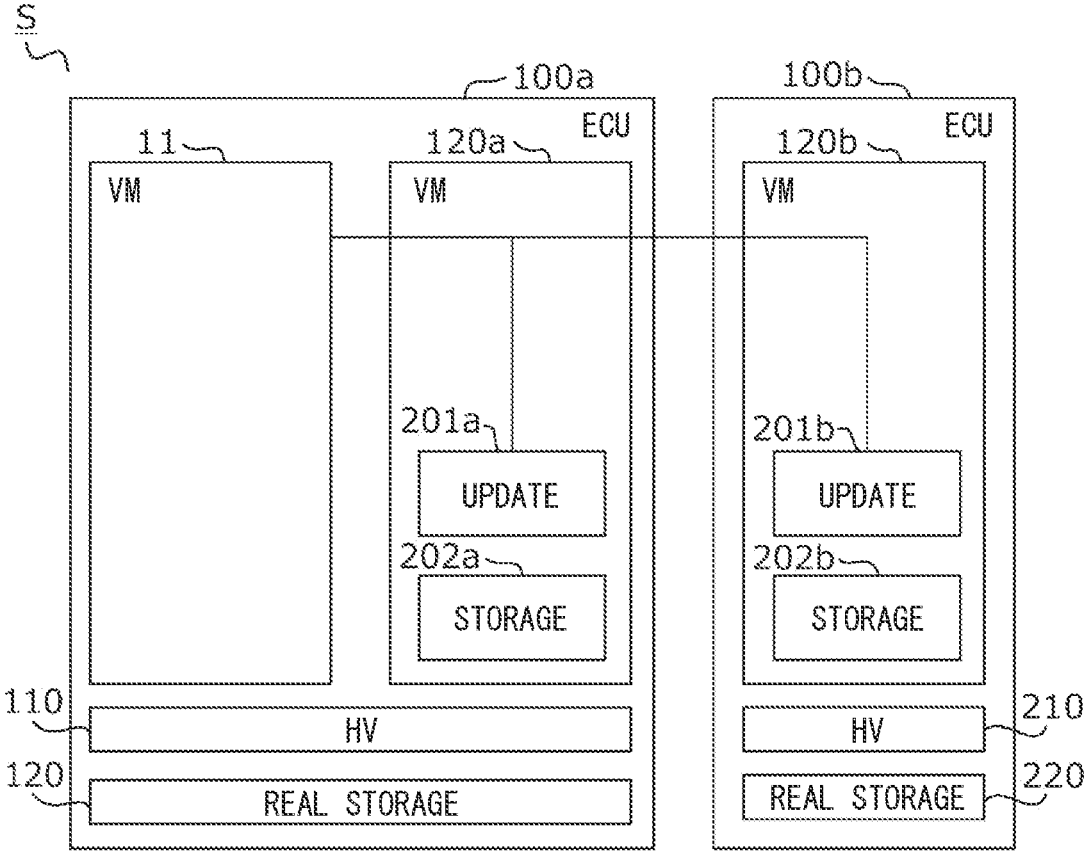
FIG. 6 is a diagram explaining a configuration example of an electronic control system according to a second embodiment.

An example of the electronic control system S of the present embodiment will be described with reference to FIG. 6. FIG. 6 illustrates two ECUs 100*a*, 100*b*. The ECU 100*a* and the ECU 100*b* configure the electronic control system S. Each of the ECUs 100*a*, 100*b* has a virtual machine (VM).

The ECU 100*a* includes a virtual machine 11, a virtual machine 120*a*, a hypervisor (HV) 110, and a real storage 120. The hypervisor 110 is software that virtualizes the ECU 100*a*. In the example of FIG. 6, the virtual machines 11, 120*a* are established on the hypervisor 110. The virtual machines 11, 120*a* constructed on the hypervisor 110 are virtually connected to each other.

Although not shown in FIG. 6, the virtual machine 11 of the present embodiment implements each configuration of the update control device 10 shown in FIG. 2. Functions and operations of each component of the virtual machine 11 are the same as in the first embodiment. The virtual machine 11 of the present embodiment functions as the update control device 10 of the first embodiment.

The ECU 100*b* is an ECU connected to the ECU 100*a* via a communication network. The ECU 100*b* includes a virtual machine 120*b*, a hypervisor 210, and a real storage 220. Similar to the ECU 100*a*, the hypervisor 210 is software that virtualizes the ECU 100*b*. The virtual machine 120*b* is established on the hypervisor 210.

The real storages 120, 220 are both hardware memories, such as volatile memories such as SRAM and DRAM or non-volatile memories such as ROMs, flash memories, or hard disks. The virtual machine 11 has a storage section 103 as similar to the update control device 10. The storage section 103 of the virtual machine 11 and the storage section 202*a* of the virtual machine 120*a* are virtual memories implemented by virtualizing the storage area of the real storage 120. The same applies to the storage section 202*b*. The storage section 202*b* is a virtual memory implemented by virtualizing the storage area of the real storage 220.

Further, the virtual machines 120*a*, 120*b* of the present embodiment implement update sections (201*a* and 201*b*) and storage sections (202*a* and 202*b*), respectively, like the ECUs 20*a*, 20*b* of each embodiment. Functions and operations of the update sections 201*a* and 201*b* and storage sections

202*a*, 202*b* of the present embodiment are the same as those of the first embodiment. That is, the virtual machines 120*a*, 120*b* of the present embodiment function as the ECUs 20*a*, 20*b* of the above described embodiment.

As described above, the storage section 103 of the virtual machine 11 and the storage section 202*a* of the virtual machine 120*a* are virtual memories implemented on the identical real storage 120. When the delivery section 105 delivers the update file stored in the storage section 103 to the virtual machine 120*a*, it may be possible to omit delivery of the update file via the network. Instead, the delivery section 105 transfers (that is, delivers) the update file stored in the storage section 103 to the storage section 202, thereby delivering the update file to the virtual machine 120*a*.

The features of the update control device according to each embodiment of the present disclosure have been described above.

Terms used in the description of each embodiment are examples and may be replaced with synonymous terms or terms having a synonymous function.

The block diagrams used for the description of the embodiments are obtained by classifying and arranging the configurations of the device for each function. The blocks representing the respective functions may be implemented by any combination of hardware or software. Further, since the block diagrams illustrate the functions, the block diagrams can be understood as disclosure of the method and the program that implements the method.

Functional blocks that can be understood as processes, flows, and methods described in the respective embodiments may be changed in order as long as there is no restrictions such as a relationship in which results of preceding other steps are used in one step.

The terms such as first, second, to N-th (where N is an integer) used in each embodiment are used to distinguish two or more configurations and methods of the same kind and are not intended to limit the order or superiority.

The update control device of each embodiment is a device for controlling the update of an electronic control unit that constitutes an in-vehicle system mounted in a vehicle. The update control device may apply to devices that control the updating of any electronic control unit unless otherwise specified in the scope of the disclosure.

Further, examples of the device described in the present disclosure include the following.

Examples of a form of a component include a semiconductor element, an electronic circuit, a module, and a microcomputer.

Examples of a form of a semi-finished product include an electric control unit (ECU) and a system board.

Examples of a form of a finished product include a cellular phone, a smartphone, a tablet computer, a personal computer (PC), a workstation, and a server.

The devices may include a device having a communication function and the like, and include, for example, a video camera, a still camera, and a car navigation system.

Each device may additionally include necessary functions such as an antenna and a communication interface.

In addition, the present invention can be implemented by not only dedicated hardware having the configurations and functions described in each embodiment but also as a combination of a program recorded in a recording medium such as a memory or a hard disk and provided to implement the present invention, and general-purpose hardware having a dedicated or general-purpose CPU, which can execute the program, and having a memory and the like.

A program stored in a tangible non-transitory computer-readable medium (for example, an external storage device (a hard disk, a USB memory, and a CD/BD) of dedicated or general-purpose hardware, or an internal storage device (a RAM, a ROM, and the like)) may also be provided to dedicated or general-purpose hardware via the recording medium or from a server via a communication line without using the recording medium. Consequently, as the program is upgraded, the corresponding latest function can be always provided.

The update control device according to the present disclosure has been described mainly to use for an in-vehicle electronic control unit mounted on a vehicle, alternatively, the update control device may be applied to general mobile bodies such as a motorcycle, a ship, a train, and an aircraft. Further, the present invention is applicable not only to mobile objects but also to general products including microcomputers.

The present disclosure can be realized in various forms such as a program. The program may be stored in a computer-readable, non-transitory tangible storage medium as instructions to be executed by a computer. For example, the program may be stored in a flash memory, ROM, or the like.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes a plurality of sections (or steps), and each section is expressed as, for example, S101. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An update control device for managing update of an electronic control device mounted on a mobile object, the update control device comprising at least one of (i) a circuit and (ii) a processor with a memory storing computer program code executable by the processor, the at least one of the circuit and the processor configured to cause the update control device to implement:

a first acquisition section configured to acquire from outside the mobile object via wireless communication a first update file group including at least one file to update the electronic control device;

a second acquisition section configured to acquire from outside the mobile object via wired communication a second update file group including at least one file to update the electronic control device;

a determination section configured to determine a common file that is common to both the first update file group and the second update file group, and a difference file that is not common to the first update file group and the second update file group, in a case where the second acquisition section acquires the second update file group after the first acquisition section acquires the first update file group and before update with the at least one file in the first update file group is completed;

a decision section configured to decide on an application update file that is a file used for the update of the electronic control device according to whether the common file and/or the difference file in the first update file group has been delivered to the electronic control device and whether an update instruction has been issued;

a delivery section configured to deliver the application update file to the electronic control device; and an instruction section configured to instruct the electronic control device to update the electronic control device with the application update file.

2. The update control device according to claim 1, wherein the common file in the first update file group is defined as a first common file, and the common file included in the second update file group is defined as a second common file, the decision section decides that the second common file is applied as the application update file in a case where the first common file has not been delivered, and the decision section decides that the first common file is applied as the applied update file in a case where the first common file has been delivered.

3. The update control device according to claim 2, wherein the decision section further decides that the difference file in the second update file group is applied as the application update file.

4. The update control device according to claim 2, wherein the decision section does not decide that the difference file in the first update file group is applied as the application update file.

5. The update control device according to claim 4, wherein the instruction section further instructs to stop updating with the difference file in the first update file group in a case where the difference file in the first update file group has been delivered and the update instruction with the difference file in the first update file group has been issued.

6. The update control device according to claim 4, wherein in a case where the difference file in the first update file group has been delivered and the update instruction with the difference file in the first update file group has been issued, the instruction section further instructs the electronic control device to return to a state before update with the difference file in the first update file group after completion of the update of the electronic control device with the difference file in the first update file group.

7. The update control device according to claim 1, wherein the difference file in the first update file group is defined as a first difference file and the difference file in the second update file group is defined as a second difference file, the decision section decides that the second difference file is applied as the application update file in a case where the first difference file has not been delivered.

8. The update control device according to claim 1, wherein the difference file in the first update file group is defined as a first difference file and the difference file in the second update file group is defined as a second difference file, the decision section decides that the second difference file is applied as the application update file in a case where the first difference file has been delivered and the update instruction with the first difference file has not been issued.

9. The update control device according to claim 1, wherein the difference file in the first update file group is defined as a first difference file and the difference file in the second update file group is defined as a second difference file, in a case where the first difference file has been delivered and the update instruction with the first difference file has been issued, the decision section decides that the second difference file is applied as the application update file, and the instruction section further instructs to stop updating with the first difference file.

10. The update control device according to claim 1, wherein the difference file in the first update file group is defined as a first difference file and the difference file in the second update file group is defined as a second difference file, in a case where the first difference file has been delivered and the update instruction with the first difference file has been issued, the decision section decides that the second difference file is applied as the application update file, and the instruction section further instructs to return to a state before update with the first difference file after completion of the update of the electronic control device with the first difference file.

11. An update control method executed by an update control device managing update of an electronic control device mounted on a mobile object comprising:

acquiring from outside the mobile object via wireless communication a first update file group including at least one file for updating the electronic control device;

acquiring from outside the mobile object via wired communication; a second update file group including at least one file for updating the electronic control device;

determining a common file that is common to both the first update file group and the second update file group, and a difference file that is not common to the first update file group and the second update file group, in a case where the second update file group is acquired after acquisition of the first update file group and before completion of update with the at least one file in the first update file group;

deciding on an application update file that is a file used for the update of the electronic control device according to whether the common file and/or the difference file in the first update file group has been delivered to the electronic control device and whether an update instruction has been issued;

delivering the application update file to the electronic control device; and instructing the electronic control device to update the electronic control device with the application update file.

12. A non-transitory computer-readable storage medium storing an update control program executable by an update control device configured to manage update of an electronic control device mounted on a mobile object, the program comprising instructions of:

acquiring from outside the mobile object via wireless communication a first update file group including at least one file for updating the electronic control device;

acquiring from outside the mobile object via wired communication a second update file group including at least one file for updating the electronic control device determining a common file that is common to both the first update file group and the second update file group, and a difference file that is not common to the first update file group and the second update file group, in a case where the second update file group is acquired after acquisition of the first update file group and before completion of update with the at least one file in the first update file group;

deciding on an application update file that is a file used for the update of the electronic control device according to whether the common file and/or the difference file in the first update file group has been delivered to the electronic control device and whether an update instruction has been issued;

delivering the application update file to the electronic control device; and instructing the electronic control device to update the electronic control device with the application update file.

13. The update control device according to claim 1, wherein the determination section determines whether or not the common file has been delivered to the electronic control device, whether or not the difference file has been delivered to the electronic control device, and whether or not the instruction section has issued the update instruction to the electronic control device.

* * * * *